Inventor
J. E. Beattie, by

Attorney

J. E. BEATTIE.
COMPASS CORRECTOR.
APPLICATION FILED MAR. 1, 1918.

1,308,692.

Patented July 1, 1919.
2 SHEETS—SHEET 2.

Inventor
J. E. Beattie, by
T. M. Witherspoon
Attorney

UNITED STATES PATENT OFFICE.

JOHN E. BEATTIE, OF NEW YORK, N. Y., ASSIGNOR TO THE CARRIE GYROSCOPIC CORPORATION, OF NEW YORK, N. Y., A CORPORATION OF NEW YORK.

COMPASS-CORRECTOR.

1,308,692.   Specification of Letters Patent.   Patented July 1, 1919.

Application filed March 1, 1918. Serial No. 219,832.

*To all whom it may concern:*

Be it known that I, JOHN E. BEATTIE, a citizen of the United States, residing at New York city, in the county of New York and State of New York, have invented certain new and useful Improvements in Compass-Correctors; and I do hereby declare the following to be a full, clear, and exact description of the invention, such as will enable others skilled in the art to which it appertains to make and use the same.

This invention relates to automatic correcting devices for gyroscopic compasses, and has for its object to improve the constructions which have been heretofore proposed.

With this and other objects in view the invention consists in the novel details of construction and combinations of parts as will be more fully hereinafter disclosed and particularly pointed out in the claims.

Referring to the accompanying drawings forming a part of this specification in which like numerals designate like parts in all the views:—

Figure 1:
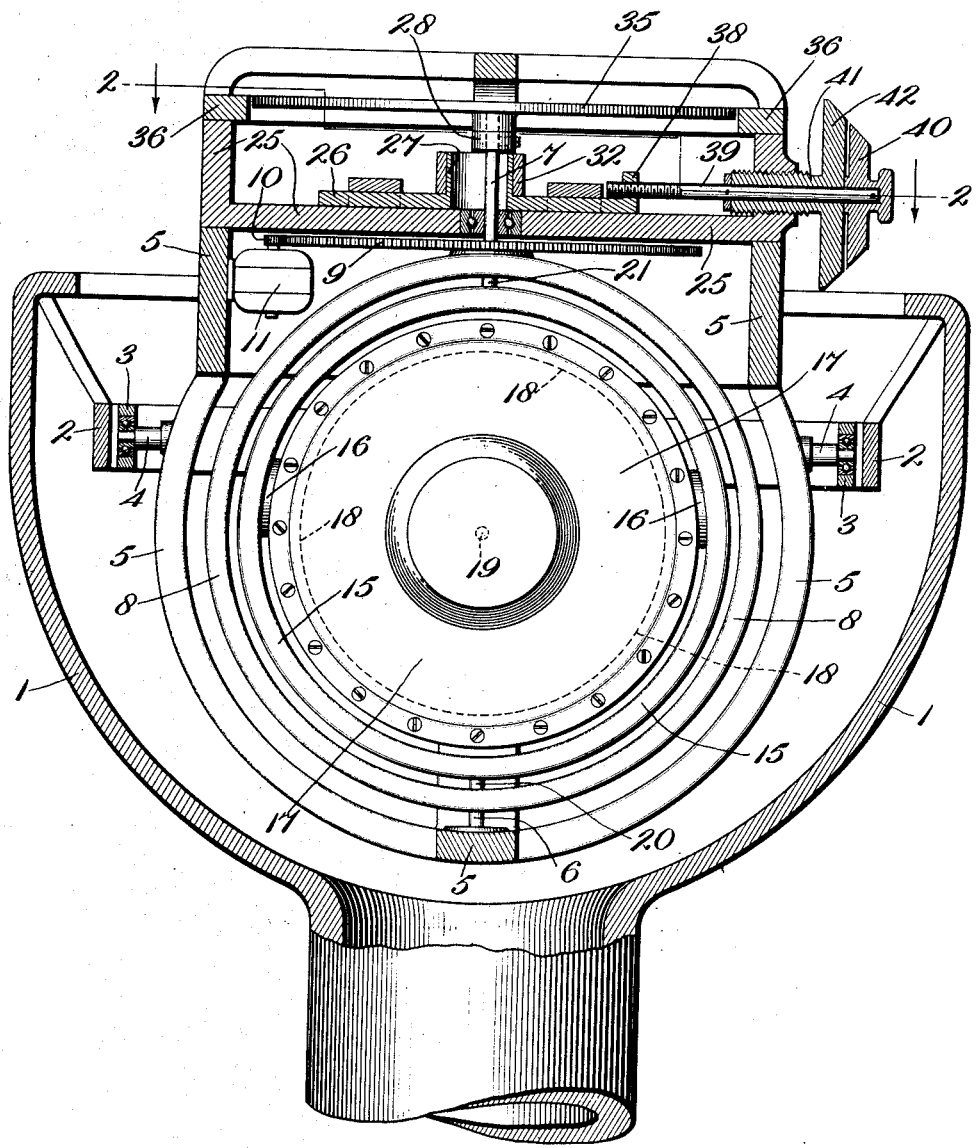
Figure 1 is a vertical sectional view of a gyroscopic compass, taken on the line 1—1 of Fig. 2, looking in the direction of the arrows, and showing the correcting device applied thereto.
Figure 2:
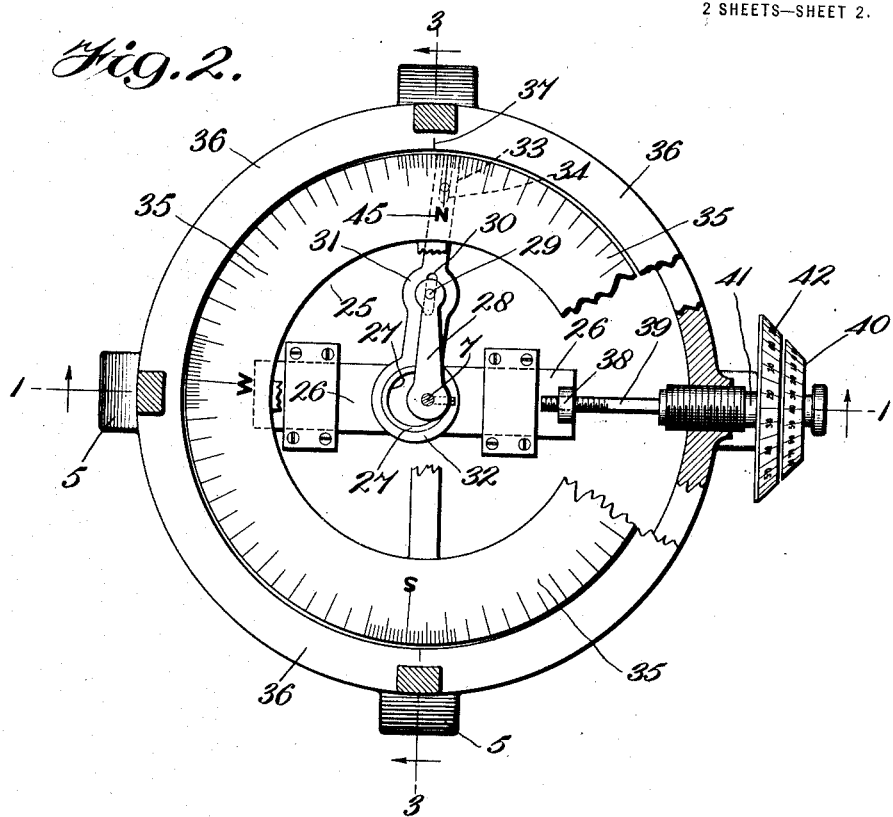
Fig. 2 is a sectional plan view partially broken away, taken on the line 2—2 of Fig. 1, looking in the direction of the arrows.
Figure 3:
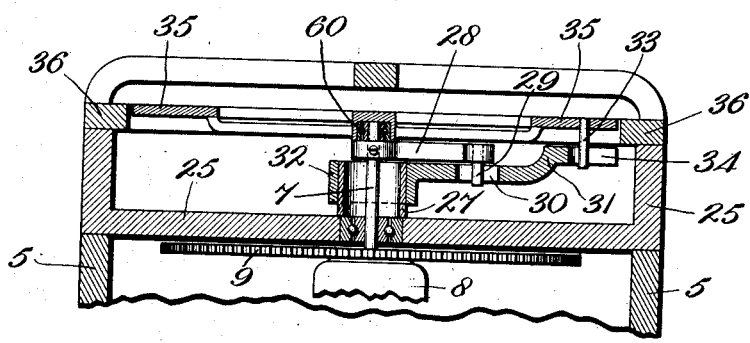
Fig. 3 is a sectional view taken on the line 3—3 of Fig. 2, looking in the direction of the arrows.

1 represents any suitable binnacle provided with the usual Cardan suspension rings 2 and 3, and pivots 4, supporting the pendulous frame 5. In said frame 5 there is supported on the pivots 6 and 7 the follow up ring 8 rigid with the gear 9, meshing with the pinion 10, carried by the motor 11, automatically operated by circuits not shown. Inside the ring 8 there is located the ring member 15 associated with the bearings 16 supporting the casing 17, inclosing the gyro wheel 18, (indicated by dotted lines), and forming a support for the rotating axle 19 of said wheel. The pivots 20 and 21 hold the ring 15 in place, and the wheel axis 19 is located belo v the line of suspension of the pendulous system so that the gyroscopic compass is a weighted one.

The foregoing parts are or may be of any approved construction and arrangement.

In order that the precise invention may be understood it is said:—Foucault more than fifty years ago recognized that a rotating gyro wheel when subjected to a force tending to change its plane of rotation will tend to set its axis of rotation parallel to the axis of rotation of the disturbing force and he therefore recognized that a weighted gyro such as that above disclosed will automatically tend to set its axis 19 parallel to the earth's axis.

But, in order to fix our ideas, suppose the compass is on a ship at the equator and that the ship sails due north at a speed of twenty knots an hour. The earth's rotation, while the ship is stationary will carry the compass toward the east at a speed of say one thousand miles an hour, and this motion, when the ship is not moving, will cause the axis 19 to set itself due north and south, or parallel to the earth's axis. On the other hand, when the ship moves due north the path of travel of the compass in space will no longer be due east, but it will be along a line making an angle with the equator, and extending in a northerly and easterly direction. Therefore, according to Foucault, the axis of the gyro wheel will now tend to set itself parallel to the axis of this new path of motion.

That is to say, the axis 19, instead of pointing due north and south, will, owing to the combined motions of the earth and the ship, point to the westward of true north, and to the eastward of true south. In the case supposed, if the vessel has continued to move due north for one hour, say twenty-three miles, the instrument will be situated twenty knots north of the equator and will have been carried through space on the arc of a great circle approximately one thousand miles. This great circle arc will be inclined to the equator at an angle "$a$," such that tangent "$a$" will equal the distance sailed divided by the total distance moved, or tangent "$a$" equals 23/1000 equals .023 equals 1° 20" approximately. That is, the north end of the axis of the gyro wheel will be deflected say 1° 20″ to the west of the true north, due to the motion of the ship combined with the rotation of the earth.

In other words, if we let:—

A = Angle of deflection due to speed of ship;
B = Angle of sailing course;
L = Angle of latitude;
S = Speed of ship in miles per hour;
V = Velocity of earth in miles per hour at equator = 1037.4;
W = Angular velocity of earth;
E = Radius of earth in miles;

Then—

$$\text{Tangent ``A''} = \frac{S \cdot \cos B}{V \cdot \cos L}$$

An analysis of the foregoing will show that the sailing speed of a ship in a northerly direction will produce a deflection "A" in a westerly direction, and a southerly sailing course a deflection "A" in an easterly direction. Therefore, it is possible to construct a mechanical device which will automatically correct the compass readings for all sailing courses, speeds, and latitudes.

Returning now to the drawings, I mount on the upper portion 25 of the pendulous frame 5, the slide member 26, having the enlarged hollow hub or bearing 27 through which passes the pivot member 7, as shown. Rigid with said member 7 is the arm 28 carrying at its outer end the pin 29 movable in the slot 30 with which the card controlling arm 31 is provided. Said card controlling arm 31 has at its inner end the enlarged journal portion 32 fitting the bearing 27 and at its outer end the slot 34 receiving the pin 33 with which the compass card 35 is provided. 36 represents a protecting rim carried by the frame 5, and provided with a lubbers point 37. 38 represents a lug carried by the slide 26, 39 a screw threaded member engaging said lug, controlled by the graduated latitude disk 40 and 41 a screw threaded member engaging the member 25, controlled by the speed disk 42 graduated in knots.

The above compass corrector operates as follows:— Suppose the parts are so adjusted that the axial center of the pin 7 coincides with the axial center of the hollow bearing 27, then if the ship be stationary, on the equator, and headed true north, the north point 45 of the card 33 will register with lubbers point 57. If now the ship sails true north at twenty knots an hour, owing to the above described combined motions, due to the rotation of the earth and the travel of the ship, the north point 45 instead of registering with the lubbers point 37 will be deflected about 1° 20″ to the westward. And from the above formula it will be clear that this deflection will vary as the speed and latitude changes. Accordingly, the parts are so proportioned that when the latitude is correctly indicated on the latitude dial 42, and the speed is correctly indicated on the speed dial 40, the center of pivot 7 will be so displaced with regard to the center of the bearing 27 that the north point 45 will be out of register with the lubbers point 37 by an amount just equal to the error that is to be corrected for.

Stated in other language, by properly proportioning the parts, an adjustment of the dials 40 and 42, to correspond with the speed and latitude, will cause the pivot 7 to be eccentrically disposed with reference to the bearing 27 in just the right amount, as the said pivot 7 turns on its axis, to cause the arm 28, pin 29, arm 31 and pin 33 to move the north point 45, out of its true position to an extent, and in a direction suitable for correcting the error that would otherwise be indicated by the card 35.

On the other hand, since the frame 5, member 25, slide 26, and bearing 27, as well as the ring 36 are carried by the binnacle, and are therefore rigid with the ship, and since the pivot 7 is relatively stationary, owing to its being under the control of the gyro wheel, it is evident that the ship may turn in azimuth and the said parts 5, 25, 26, 27 and 36 may readily turn around the pivot 7 as a center.

When the bearing 27 thus turns around the pivot 7 as a center, it of course, moves the end 32 of the arm 31 around the pin 29 as a center, and therefore, it causes the pin 33 to correspondingly move the card 35. That is to say, should the ship turn from north to east the motion just described will bring the north point 45 into its true position and the correction of the device will become zero, as it should be on east and west courses.

On all other courses the eccentricity of the pivot 7 will vary and therefore a correction will be had, the value of which will depend upon the particular course being sailed as should be the case.

In other words, the eccentric disposition of the parts 7 and 27 governs the value of the correction for various courses, while the dials 40 and 42 governs said valve for various latitudes and speeds.

The card 35 is preferably mounted on the ball bearing 60 so that the pivot 7 may freely rotate in said bearing, and leave the card entirely under the control of the arm or lever 28 and its co-acting parts.

The follow up ring 8 is controlled by the wheel 18, and as is well known, it automatically maintains its plane relative to the plane of said wheel through the action of the motor 11. As the pivot 7 is rigid with said follow up ring, said pivot therefore always maintains its correct position relative to said wheel 18, and in fact, is controlled thereby.

It is obvious that those skilled in the art may vary the details of construction as well as the arrangement of parts without departing from the spirit of the invention, and therefore, I do not wish to be limited to the above disclosure except as may be required by the claims.

What I claim is:—

1. In a compass corrector the combination of a gyroscopic wheel; a pivot controlled by said wheels; a compass card carried by said pivot and adjustable in azimuth thereabout; lever connections between said card and pivot for controlling such adjustment; and eccentric means for controlling said lever connections, substantially as described.

2. In a compass corrector the combination of a gyroscopic wheel; a pivot controlled by said wheel; a compass card carried by said pivot and adjustable in azimuth thereabout; lever connections between said card and pivot for controlling such adjustment; eccentric means for controlling said lever connections; and adjustable means for controlling said eccentric means, substantially as described.

3. In a compass corrector the combination of a gyroscopic wheel; a pivot controlled by said wheel; a compass card carried by said pivot and adjustable in azimuth thereabout; lever connections between said card and pivot for controlling such adjustment; eccentric means for controlling said lever connections; and adjustable means comprising a speed and a latitude dial for controlling said eccentric means, substantially as described.

4. In a compass corrector the combination of a gyroscopic wheel; a pivot controlled by said wheel; a compass card carried by said pivot and adjustable in azimuth thereabout; a bearing eccentrically disposed with reference to said pivot; means for moving said card in azimuth controlled by the rotations of said bearing relative to the pivot; and means for adjustably controlling the eccentricity of said bearing, substantially as described.

5. In a compass corrector the combination of a gyroscopic wheel; a pivot controlled by said wheel; a compass card carried by said pivot and adjustable in azimuth thereabout; a bearing eccentrically disposed with reference to said pivot; means for moving said card in azimuth controlled by the rotations of said bearing relative to the pivot; and means comprising a latitude and a speed dial for adjustably controlling the eccentricity of said bearing, substantially as described.

6. In a compass corrector the combination of a gyroscopic wheel; a pivot controlled by said wheel; a compass card carried by said pivot and adjustable in azimuth thereabout; a bearing eccentrically disposed with reference to said pivot; means comprising a pair of arms having slot and pin connections for moving said card in azimuth and controlled by the rotations of said bearings; and means for adjustably controlling the eccentricity of said bearing, substantially as described.

In testimony whereof I affix my signature, in presence of two witnesses.

JOHN E. BEATTIE.

Witnesses:
G. A. ROSSITER,
CHAS. G. ANDERSON.